United States Patent
Park

(10) Patent No.: US 8,932,972 B2
(45) Date of Patent: Jan. 13, 2015

(54) REMANUFACTURED SCR AGED CATALYST BY IN-SITU TECHNOLOGY

(71) Applicant: Hanseo University Academic Cooperation Foundation, Seosan-si Chungcheongnam-do (KR)

(72) Inventor: Hae Kyung Park, Seoul (KR)

(73) Assignee: Hanseo University Academic Cooperation Foundation, Seosan-si Chungcheongnam-do (KR)

( * ) Notice: Subject to any disclaimer, the term of this patent is extended or adjusted under 35 U.S.C. 154(b) by 0 days.

(21) Appl. No.: 14/128,233

(22) PCT Filed: May 14, 2013

(86) PCT No.: PCT/KR2013/004240
§ 371 (c)(1),
(2) Date: Dec. 20, 2013

(87) PCT Pub. No.: WO2014/058121
PCT Pub. Date: Apr. 17, 2014

(65) Prior Publication Data
US 2014/0342901 A1 Nov. 20, 2014

(30) Foreign Application Priority Data
Oct. 12, 2012 (KR) ........................ 10-2012-0113672

(51) Int. Cl.
*B01J 23/92* (2006.01)
*B01J 23/30* (2006.01)
(52) U.S. Cl.
CPC ........ *B01J 23/92* (2013.01); *B01J 23/30* (2013.01); *Y10S 502/514* (2013.01)
USPC ............................................ 502/27; 502/514
(58) Field of Classification Search
USPC ................................. 502/27, 22, 514
See application file for complete search history.

(56) References Cited

FOREIGN PATENT DOCUMENTS

| KR | 10-2007-0006584 A | 1/2007 |
|---|---|---|
| KR | 10-0668926 B1 | 1/2007 |
| KR | 10-2011-0027489 A | 3/2011 |
| KR | 10-2011-0116454 A | 10/2011 |
| KR | 10-2012-0028049 A | 3/2012 |
| KR | 10-2012-0081914 A | 7/2012 |

OTHER PUBLICATIONS

International Search Report and Written Opinion dated Sep. 4, 2013 from the corresponding PCT/KR2013/004240.
Notice of Decision to Grant Patent dated Dec. 4, 2013 from the corresponding Korean Application No. 10-2012-0113672.
"A regeneration of waste SCR catalyst using sulfuric Acid solution" Sungnam Chun et al., J. of material cycles and waste management, vol. 29, No. 6, 575-582 (Sep. 28, 2012).

*Primary Examiner* — Edward Johnson
(74) *Attorney, Agent, or Firm* — Katten Muchin Rosenman LLP

(57) ABSTRACT

This invention relates to an in-situ remanufacturing method of SCR aged catalyst. More specifically, in case the activity of the catalyst, which is used in selective catalytic reduction (SCR) to remove nitrogen oxides, is decreased, such deactivated catalyst, in this in-situ remanufacturing method, is not to be separated from its related reactor but to be remanufactured in-situ for elimination in this method, which, compared to the one that otherwise includes detachment and transportation to remanufacturing facilities, should prevent potential damage to the catalyst, reduce transportation costs as well as additional enormous costs depending upon unloading and loading of the catalyst and shorten the remanufacturing time. The activity of reclaimed catalyst in this invention is recovered at a level of 95% or more than that of fresh SCR catalyst by rapidly facilitating the in-situ elimination of any contaminant and possesses high economic efficiency as there is no catalyst loss during the process. The reuse of the catalyst which otherwise is to be disposed is also possible, mitigating environmental burden.

3 Claims, 1 Drawing Sheet

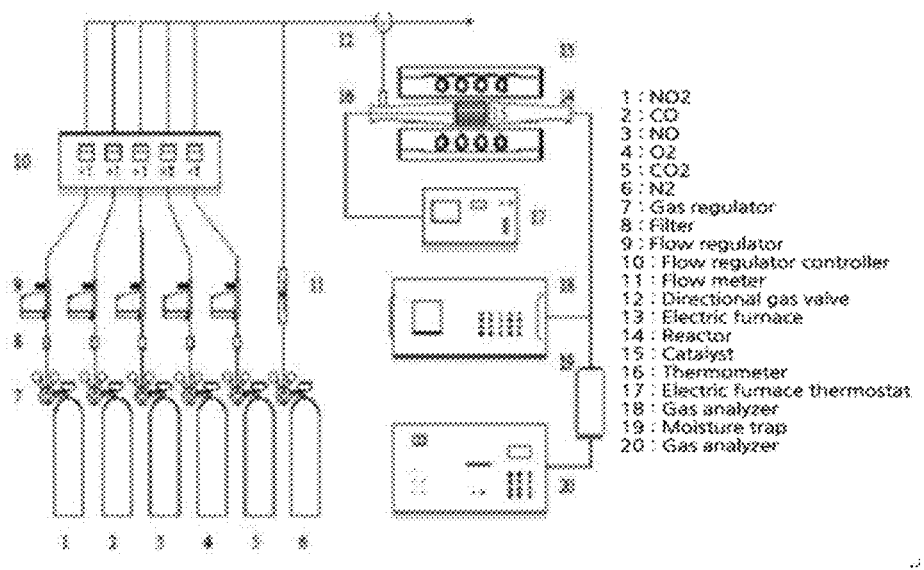

REMANUFACTURED SCR AGED CATALYST BY IN-SITU TECHNOLOGY

TECHNICAL FIELD

This invention relates to an in-situ remanufacturing method of SCR aged catalyst. More specifically, in case the activity of the catalyst, which is used in selective catalytic reduction (SCR) to remove nitrogen oxides, is decreased, such deactivated catalyst, in this in-situ remanufacturing method, is not to be separated from its related reactor but to be remanufactured in-situ for elimination in this method, which, compared to the one that otherwise includes detachment and transportation to remanufacturing facilities, should prevent potential damage to the catalyst, reduce transportation costs as well as additional enormous costs depending upon unloading and loading of the aged catalyst and shorten the remanufacturing time.

BACKGROUND

Exhaust gases emitted from combined heat and power plants, coal power plants and/or incineration plants generally contain hazardous substances including hydrogen chloride, sulfur oxides, nitrogen oxides, dioxin and dioxin-like compounds. In this context, SCR accounts for a widespread method applied to eliminate, inter alia, specifically nitrogen oxides using $NH_3$ as reducing agent.

As a small quantity of $V_2O_5$ and $WO_3$ with $TiO_2$ compose the catalyst system for the SCR denitrification process hereinbefore provided, the catalyst is to be contaminated with the impurities and contaminants contained in the exhaust gases in the course of operating time, which decrease its activity coming down to substantial termination of it after, on average, two to three years.

It has thus been required that a new remanufacturing method for deactivated, denitrified SCR catalysts be developed for its recovery and reclamation to its initial performance. This is therefore an urgent technology taking into consideration not only its future import substitution but also in the point of view of resource recycling.

The remanufacturing method mentioned above is classified into physical modes and chemical ones. One of the conventional, the physical technique includes procedures in which the deactivated catalyst is unloaded from the reactor and transported to the catalyst remanufacturing facilities in order to blow away the deposits on the surface of the catalyst by using compressed air. The carbon-based absorbate on the surface are combusted via a high-temperature roasting process. Another method includes ultrasonic cleaning of deactivated catalyst while it is submerged in distilled water.

On the other hand, cleaning by a diluted acid or alkali solution, or their mixed solution entailing ultrasonic cleaning has been attempted as a chemical method. Also, other alternative remanufacturing schemes which combine physical and chemical ones aforementioned are also known.

However, since the methods so far introduced requires the aged catalyst to be unloaded from the SCR reactor and transported to the catalyst remanufacturing facilities, damage to the catalyst during the transportation as well as cost increase are inevitable. In addition, there are problems such as the remanufacturing method such as physical grinding being disarranged and the aged catalyst being broken down or destructed during the remanufacturing To this, KR 10-2012-0081914A created a catalyst recycling system including a multi-functional washing bath to cleanse the aged catalyst, but it protracts the cleaning period and because it carries out several subordinate treatments, the cleaning process is complicated. The so increasing operating costs are another problem.

Thus, the inventors hereby have committed to work through the challenges in that it is impossible to utilize ultrasonic devices for cleaning with the aged catalyst being set in the reactor in situ. Thus, they rounded out this invention having verified that optimal conditions for a remanufacturing solution and cleaning methods are to be employed to maximize the remanufacturing efficiency by exploiting the minimum remanufacturing solution within the shortest time possible. This prevents catalyst destruction, cuts down transportation costs as well as the enormous costs depending upon unloading and loading of the catalyst and shorten the remanufacturing time.

SUMMARY

The objective of this invention is to provide a new remanufacturing method to recover, within the minimum period without unloading and loading of the denitrified aged catalyst at routine maintenance of its reactor, the activity of SCR aged catalyst of which life has materially come to an end.

To achieve the objectives, this invention should afford an eliminating process which is to remove deactivating materials over denitrified aged catalyst containing titanium dioxide, vanadium and tungsten of which activity has been noticeably decreased that does not involve ultrasonic waves by utilizing an acid solution of 1 to 6 mol % as a cleaning agent; a cleaning process that cleans out the catalyst which has been acid-treated during the prior eliminating process; a drying process which dries the catalyst that has been cleaned out during the prior cleaning process.

The activity of reclaimed catalyst in this invention is recovered at a level of 95% or more than that of fresh SCR catalyst by rapidly facilitating the in-situ elimination of any contaminant and possesses high economic efficiency as there is no catalyst loss during the process. The reuse of the catalyst which otherwise is to be disposed is also possible, mitigating environmental burden.

BRIEF DESCRIPTION OF THE DRAWINGS

The accompanying drawing, which are included to provide a further understanding of the invention, illustrate the preferred embodiments of the invention, and together with the description, serve to explain the principles of the present invention. In drawing:

FIG. 1 is a schematic illustration that shows the SCR catalyst performance assessment system made in order to evaluate the efficiency of remanufactured catalyst according to this invention.

DETAILED DESCRIPTION

All technical and scientific terms set forth in this specification should, except otherwise provided in any other way, signify the same meaning as how experts, who belong to the same technological field as this invention, would comprehend. Generally, the nomenclature used in this specification is well known and prevalently used.

In this whole specification, when it says a constituent "contains" a component, this implies, unless otherwise provided, that it may contain other components, not that it excludes another component.

Catalysts of which life has come to an end in this invention more specifically means the SCR catalyst which was employed in denitrification SCR facilities to remove nitrogen oxides and has been contaminated with impurities and contaminants contained in exhaust gases for a long time during that process and because its consequential activity has decreased down to 70% or below of that of the initial catalyst, the catalyst may refer to denitrified SCR aged catalyst letting this specification prescribe that the denitrified SCR aged catalyst should be regarded as catalyst of which life has materially come to an end or activity, profoundly decreased.

In the same light, this invention should afford an eliminating process which removes deactivating materials of denitrified aged catalyst containing titanium dioxide, vanadium and tungsten of which activity has been pronouncedly decreased in a relevant cleaning device that does not involve ultrasonic waves by utilizing an 1 to 6 mol % of acid solution as a cleaning agent; a cleaning process which cleans out the catalyst that has been acid-treated and a drying process which dries the catalyst that has been cleaned out during the prior cleaning process.

In this invention, any contaminant on the surface of the denitrified SCR aged catalyst aforementioned is to be blown away by injecting high-pressure, more desirably with a pressure of 0.1-0.5 kg/cm$^2$, compressed air then the deposit is to be cleaned with an acid solution.

The acid solution previously mentioned, is in nature an inorganic acid solution containing sulfuric acid, nitric acid or mixture thereof, wherein mixture is obtained by mixing sulfuric acid and nitric acid solution with the volume ratio, 1:1. The concentration of the acid solution should be ranged 1 to 6 mol %, more desirably 3 to 5 mol %, as cleaning is ineffective at a lower concentration not leading to the targeted activity of the remanufactured catalyst. At a significantly higher concentration, the contaminant is to be sufficiently removed but vanadium and tungsten which constitutes the active substance in the catalyst may also be in part removed.

The discharge of acid solution or the mixed one aforementioned should have a volumetric flow rate of 0.05-0.5 cm$^3$/min, more desirably, 0.1-0.3 cm$^3$/min per unit volume of the aged catalyst. If the volumetric flow rate doesn't get within the range, at a lower rate the catalytic activity may fail to achieve the targeted value due to insufficient contaminant removal at a lower rate whereas at a higher rate the collecting/treatment costs of cleaning agent may go up faster in relation to the benefit of activation increase, which is also inappropriate.

After washing out the treatment-completed catalyst using distilled water for 5 to 10 minutes, drying it at around 150° C. for about 2 hours is required. Then catalytic activity should be evaluated with the performance assessment system for nitrogen oxide converting activity of the remanufactured catalyst, which accepts stimulated exhaust gas conditions linked to the catalyst pertinent to it, where the catalyst is to be embedded in the SCR equipment and its reaction activity is to be evaluated with the equipment being operated.

When the nitrogen oxide conversion rate fails to meet the required value, vanadium, tungsten, for activating catalyst, or the mixture thereof should be impregnated over the surface of the catalyst, where the impregnated content of each should be at most 3.0 wt % and 1.0 wt %, respectively, depending on the catalyst's weight.

This invention hereby will be delineated more specifically using embodiments. Such examples should only be used for informative purposes and the scope of this invention must not be limited to these examples, which should be evident to those with common sense.

Preferred Embodiment 1

Remanufacturing of the Denitrified SCR Aged Catalyst

Denitrified SCR aged catalyst of which life has effectively come to an end was separated from the catalyst holder set in the SCR facility in order to collect the catalyst.

Where the collected catalyst was honeycomb-shaped on which heavy metal species were deposited leading to its color changed that has turned to dark brown and the activity showed a measurement down to 70% or below at 300 to 400° C. in relation to that of the fresh one.

Then, the collected catalyst was cut to a cake specimen of 15 cm×15 cm×10 cm on which compressed air of 0.3 kg/cm$^2$ was injected in order to remove the contaminants deposited on its surface.

Next, a cleaning solution, nitric or sulfuric acid of 1-3 mol % or their mix leading to a solution of 2-6 mol %, was injected along 0.3 cm$^3$/min without applying ultrasonic waves in order to remanufacture the denitrified SCR aged catalyst.

Example 1

Performance Assessment of the Remanufactured Catalyst

The catalytic reactor to evaluate the performance of the catalyst remanufactured complying with Preferred embodiment 1 was a continuous-flow atmospheric pressure reactor and was constructed to a dimension of 45 cm3 (3 cm×3 cm×5 cm). It was to simulate the exhaust gas conditions emitted from the conventional SCR catalytic reactor employed in combined heat and power plants and the flow of all the gases exploited in nitrogen oxide reduction was controlled by means of an MFC (Mass Flow Controller)[F-100C, Bronkhorst Co.], which used a PID controller to keep a reactor temperature at 300 to 400° C. and a space velocity at 6000 hr$^{-1}$. Two gas analyzers [Greenline D max. II, 9000, EUROTRON] plus [Hewlett Packard 9000, Hewlett Packard, USA] were used to assess the reactants.

According to the concentration of sulfuric acid and nitric acid that varied from 1 to 3 mol %, as shown in Table 1, the nitrogen oxide conversion rate of the remanufactured catalyst at 350 to 400° C., the activation temperature range, was reclaimed 100% or more in relation to that of the aged catalyst, where the effect was more prominent, at a higher concentration, in nitric acid than in sulfuric acid.

TABLE 1

Nitrogen oxide conversion rate (%) of the remanufactured catalyst according to the concentration of the acid solution.

| | | aged catalyst | sulfuric acid | | | nitric acid | | |
|---|---|---|---|---|---|---|---|---|
| | | | 1 mol % | 2 mol % | 3 mol % | 1 mol % | 2 mol % | 3 mol % |
| temp (° C.) | 300 | 19 | 69 | 74 | 72 | 81 | 76 | 79 |
| | 350 | 39 | 82 | 84 | 83 | 81 | 84 | 92 |
| | 400 | 66 | 94 | 94 | 92 | 94 | 94 | 97 |

Table 2 shows the nitrogen oxide conversion rate in a mixed solution composing both sulfuric acid and nitric acid whose volumetric ratio was 1 to 1, which verifies that the conversion rate was higher in the mixed solution than in a solution containing a single kind of acid, a synergetic effect due to mixing.

But the conversion rate was kept stable or decreased, if anything, from 4 mol % even if the concentration rose further, which suggests that 4 mol % should be chosen as the optimal reference to cleaning agent preparation.

The conversion rate following volumetric flow rate change per unit volume of the catalyst increased at a lower concentration but was kept substantially stable at a higher, which suggests that a flow rate of the cleaning agent of 0.1-0.3 0.3 $cm^3$/min should be chosen as the optimal treatment condition.

TABLE 2

Nitrogen oxide conversion rate (%) of remanufactured catalyst according to the concentration of mixed acid solution

| | aged catalyst | mixed cleaning agent (sulfuric acid + nitric acid) | | | | | |
|---|---|---|---|---|---|---|---|
| | | 0.15 $cm^3$/min | | | 0.3 $cm^3$/min | | |
| | | 2 mol % | 4 mol % | 6 mol % | 2 mol % | 4 mol % | 6 mol % |
| temp (° C.) | 300 | 19 | 69 | 83 | 83 | 71 | 90 | 88 |
| | 350 | 39 | 84 | 97 | 90 | 90 | 96 | 93 |
| | 400 | 66 | 97 | 99 | 94 | 97 | 97 | 97 |

In order to correct the catalyst which showed a performance of 90% or less in relation to the fresh catalyst on the basis of the results specified Table 1 and 2 on the conversion rate measurement, the performance of catalyst with 3 wt % of vanadium[Ammonium meta vanadate, Junsei Chemical, Japan] and 1 wt % of tungsten[Ammonium tungstate hydrate, Junsei Chemical, Japan] impregnated was assessed using the same experimental system as used in the acid treatment, of which results are shown in Table 3.

After impregnation, the nitrogen oxide conversion rate of the remanufactured denitrified SCR catalyst went up to 90% or more, at 350-400° C., the activation temperature range, in relation to the fresh catalyst, which suggests that an excellent performance of catalyst was remanufactured.

TABLE 3

Nitrogen oxide conversion rate (%) of remanufactured catalyst after catalytic performance correction

| | aged catalyst | sulfuric acid | | nitric acid | | sulfuric acid + nitric acid |
|---|---|---|---|---|---|---|
| | | 1 mol % | 2 mol % | 1 mol % | 2 mol % | 2 mol % |
| temp (° C.) | 300 | 19 | 82 | 84 | 85 | 85 | 89 |
| | 350 | 39 | 91 | 92 | 91 | 91 | 94 |
| | 400 | 66 | 95 | 96 | 95 | 97 | 98 |

The optimal conditions were ascertained in terms of acidic cleaning solution preparation, its treatment and catalytic performance correction in order for the activity of the remanufactured catalyst to be 90% or more in relation to the fresh one in the remanufacturing process of denitrified SCR aged catalyst.

Thus far, the authors have described the specific components of this invention in detail and this invention should include, but not limited to such well-laid out depiction as only a best mode, as those who possess usual knowledge in this technology are to accept. In this perspective, the effective scope of this invention is not limited to the embodiments described, but may be determined by the claims and their equivalent.

What is claimed is:

1. Regarding denitrified SCR aged catalyst containing titanium dioxide, vanadium and tungsten, of which life has come to an end, an in situ remanufacturing method of denitrified SCR aged catalyst including:
    a deactivating material eliminating process which is to remove deactivating materials utilizing a relevant cleaning device that does not involve ultrasonic waves, by utilizing an acidic solution of 3 to 5 mol % as a cleaning agent with a volumetric flow rate per unit volume of said aged catalyst of 0.05-0.5 $cm^3$/min;
    a cleaning process which cleans out the catalyst which has been acid-treated during the prior eliminating process;
    a drying process which dries the catalyst which has been cleaned out during the prior cleaning process.

2. The method of claim 1, wherein a remanufacturing method of denitrified SCR aged catalyst further includes, after said drying process, a correction process that improves the catalytic performance by impregnating vanadium, tungsten or mixture thereof, for activating catalyst, on the catalyst surface in which vanadium is impregnated up to 3.0 wt % and tungsten is impregnated up to 1.0 wt %, respectively in relation to the weight of the catalyst.

3. The method of claim 1, wherein said cleaning agent is to sulfuric acid, nitric acid or mixture thereof.

* * * * *